United States Patent
Gaschler (10) Patent No.: US 11,325,256 B2
(45) Date of Patent: May 10, 2022

(54) TRAJECTORY PLANNING FOR PATH-BASED APPLICATIONS

(71) Applicant: Intrinsic Innovation LLC, Mountain View, CA (US)

(72) Inventor: Andre Gaschler, Munich (DE)

(73) Assignee: Intrinsic Innovation LLC, Mountain View, CA (US)

(*) Notice: Subject to any disclaimer, the term of this patent is extended or adjusted under 35 U.S.C. 154(b) by 75 days.

(21) Appl. No.: 16/865,940

(22) Filed: May 4, 2020

(65) Prior Publication Data
US 2021/0339390 A1   Nov. 4, 2021

(51) Int. Cl.
*B25J 9/16* (2006.01)
*B25J 9/02* (2006.01)

(52) U.S. Cl.
CPC .......... *B25J 9/1664* (2013.01); *B25J 9/023* (2013.01)

(58) Field of Classification Search
CPC .............................. B25J 9/1664; B25J 9/023
USPC ................................................. 700/245–264
See application file for complete search history.

(56) References Cited

U.S. PATENT DOCUMENTS

| | | | | |
|---|---|---|---|---|
| 4,338,672 A * | 7/1982 | Perzley | G05B 19/425 | 901/7 |
| 4,639,878 A * | 1/1987 | Day | G01B 11/002 | 348/94 |
| 6,067,572 A * | 5/2000 | Jensen | H04Q 3/66 | 340/2.7 |
| 6,366,813 B1 * | 4/2002 | DiLorenzo | A61B 5/389 | 607/45 |
| 7,313,463 B2 * | 12/2007 | Herr | B62D 57/032 | 700/245 |
| 7,974,737 B2 * | 7/2011 | Tilove | B25J 9/1666 | 700/253 |
| 8,386,080 B2 * | 2/2013 | Bosscher | B25J 9/1676 | 700/250 |
| 8,504,188 B2 * | 8/2013 | Keibel | A61N 5/10 | 700/250 |
| 8,942,846 B2 * | 1/2015 | Jacobsen | B25J 5/005 | 700/245 |
| 9,773,429 B2 * | 9/2017 | Boulware | B23K 9/0956 | |
| 10,353,399 B2 * | 7/2019 | Ebrahimi Afrouzi | G05D 1/0219 | |
| 2005/0209534 A1 * | 9/2005 | Dariush | A61B 5/1122 | 600/595 |
| 2005/0209535 A1 * | 9/2005 | Dariush | A61B 5/1038 | 600/595 |

(Continued)

OTHER PUBLICATIONS

International Search Report and Written Opinion in Appln. No. PCT/US2021/029899, dated Auzust 2, 2021, 17 pages.

(Continued)

*Primary Examiner* — Jaime Figueroa
(74) *Attorney, Agent, or Firm* — Fish & Richardson P.C.

(57) ABSTRACT

Methods, systems, and apparatus, including computer programs encoded on computer storage media, for controlling a robot along a goal path. An initial Cartesian path is generated based on a goal path on a workpiece. Dynamic properties of the robot while the robot traverses an initial joint-space trajectory having an initial velocity profile are obtained. An adjusted velocity profile over the Cartesian path is generated based on the obtained dynamic properties. A trajectory is generated by combining the initial Cartesian path and the adjusted velocity profile.

18 Claims, 6 Drawing Sheets

(56) References Cited

U.S. PATENT DOCUMENTS

| | | | | |
|---|---|---|---|---|
| 2006/0009978 A1* | 1/2006 | Ma | | 704/266 |
| 2007/0016329 A1* | 1/2007 | Herr | | A61F 2/70 |
| | | | | 700/250 |
| 2010/0198404 A1* | 8/2010 | Sonner | | B25J 9/1674 |
| | | | | 700/250 |
| 2011/0066282 A1* | 3/2011 | Bosscher | | B25J 9/1676 |
| | | | | 700/255 |
| 2011/0153297 A1* | 6/2011 | Keibel | | A61N 5/1043 |
| | | | | 703/7 |
| 2011/0206236 A1* | 8/2011 | Center, Jr. | | G06T 7/579 |
| | | | | 382/103 |
| 2014/0039517 A1* | 2/2014 | Bowling | | A61B 34/32 |
| | | | | 606/130 |
| 2014/0039681 A1* | 2/2014 | Bowling | | A61B 34/37 |
| | | | | 700/261 |
| 2015/0142172 A1* | 5/2015 | Jacobsen | | B66C 1/425 |
| | | | | 700/257 |
| 2015/0265358 A1* | 9/2015 | Bowling | | A61B 17/16 |
| | | | | 700/261 |
| 2019/0210224 A1* | 7/2019 | Zanchettin | | B25J 9/1664 |
| 2019/0291277 A1* | 9/2019 | Oleynik | | B25J 9/1669 |

OTHER PUBLICATIONS

Pashkevish et al., "Computer-aided programing of robotic manufacturing cells for laser cutting applications," ETFA 2001. 8th International Conference on Emerging Technologies and Factory Automation. Proceedings (Cat. No. 01TH8597), Oct. 2001, pp. 603-612.

Pavlichenko et al., "Efficient stochastic multicriteria arm trajectory optimization," 2017 IEEE/RSJ International Conference on Intelligent Robots and Systems, Sep. 2017, pp. 4018-4025.

* cited by examiner

TRAJECTORY PLANNING FOR PATH-BASED APPLICATIONS

BACKGROUND

This specification relates to robotics, and more particularly to trajectory planning for path-based applications. An example of a path-based application for a robot is for the robot to dispense glue along a curved zig-zag path over a non-flat surface of a workpiece. In another example, the path-based application can be to have the robot deburr rough edges along a sequence of curved edges on a workpiece.

Trajectory planning for path-based applications has traditionally required a large amount of manually generated control points and robot controller parameters (e.g., velocities and blending parameters). The extremely large search space of the number of possible control points and robot controller parameters is such that even cloud-based offline planning systems cannot be used to generate a trajectory solution.

Trajectory planning for path-based applications has thus traditionally required immense amounts of manual programming by highly experienced users in order to set the control points and robot controller parameters in a three-dimensional (3D) simulation software. Manual programming is tedious, time-consuming, and error prone. In addition, a trajectory that is manually generated for one goal path on a workpiece can generally not be adjusted to a variant of the goal path, a variant of the workpiece or a variant of the pose of the workpiece.

Even after a trajectory solution is generated, manually programmed solutions are very brittle, and even small disturbances in the process can halt production lines. Thus, manually programmed solutions for path-based applications typically require workpieces to be held in place by fixtures, which adds complexity to the process and slows it down.

SUMMARY

This specification describes how a system can find a sequence of valid configurations that moves an end effector of a robot along a goal path.

In some implementations, a planning system generates, on the one hand, a Cartesian path with no notion of velocity, and, on the other hand, a velocity profile. The planning system then combines the Cartesian path and the velocity profile to generate a trajectory. As such, the search space of the number of possible control points and robot controller parameters is reduced such that the planning system can automatically generate the trajectory.

In some implementations, the system first generates an initial Cartesian path based on the goal path. The initial Cartesian path represents how an end effector of a robot should follow a goal path on a workpiece. The initial Cartesian path has no notion of velocity. The system runs a simulation of the robot on a joint-space trajectory having an initial velocity profile over the initial Cartesian path. The system generates an adjusted velocity profile over the initial Cartesian path based on the dynamic properties of the robot computed during the simulation. The system generates a trajectory by combining the initial Cartesian path and the adjusted velocity profile.

Particular embodiments of the subject matter described in this specification can be implemented so as to realize one or more of the following advantages.

The techniques described in this specification allow for automatically generating a trajectory that causes an end effector of a robot to follow the goal path within a number of different parameters of a process definition. For example, the process definition can include a maximum distance between a location of the end effector and the goal path. The process definition can also include an optimal orientation of the end effector with respect to the surface of the workpiece.

The techniques described in this specification can be used to optimize the tool orientation within process parameters. For example, when the robot deburrs an edge, the engineer only needs to specify the edge as part of Computer-aided design (CAD) and provide a range of tool angles as process parameters. The planning system is then able to find a fast, smooth trajectory within this range.

The techniques described in this specification can also be used to automatically generate a trajectory to follow the goal path while also remaining within dynamic limits of the robot. For example, the dynamic limits of the robot can include a maximum joint position, a maximum joint velocity, a maximum joint acceleration, a maximum Cartesian position, a maximum Cartesian velocity, a maximum Cartesian acceleration, or a jerk limit. Staying within the dynamic limits of the robot can improve the precision of the movements of the robot, which also improves the robustness and reliability of the resulting process. In addition, staying within the dynamic limits of the robot can reduce the wear of various mechanical parts of the robot. Some embodiments increase the speed of the robot along the goal path. Some embodiments allow the robot to follow the goal path with smooth motion.

The techniques described in this specification also result in an output that can be adapted at runtime. For example, the trajectory can be adjusted to the actual dimensions of the workpiece, or to the actual pose of the workpiece. This alleviates the need for fixtures to maintain the workpiece in a nominal pose for which the trajectory was generated, which reduces complexity of the process and the cycle time. Some embodiments thus support freely moving workpieces without fixtures.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
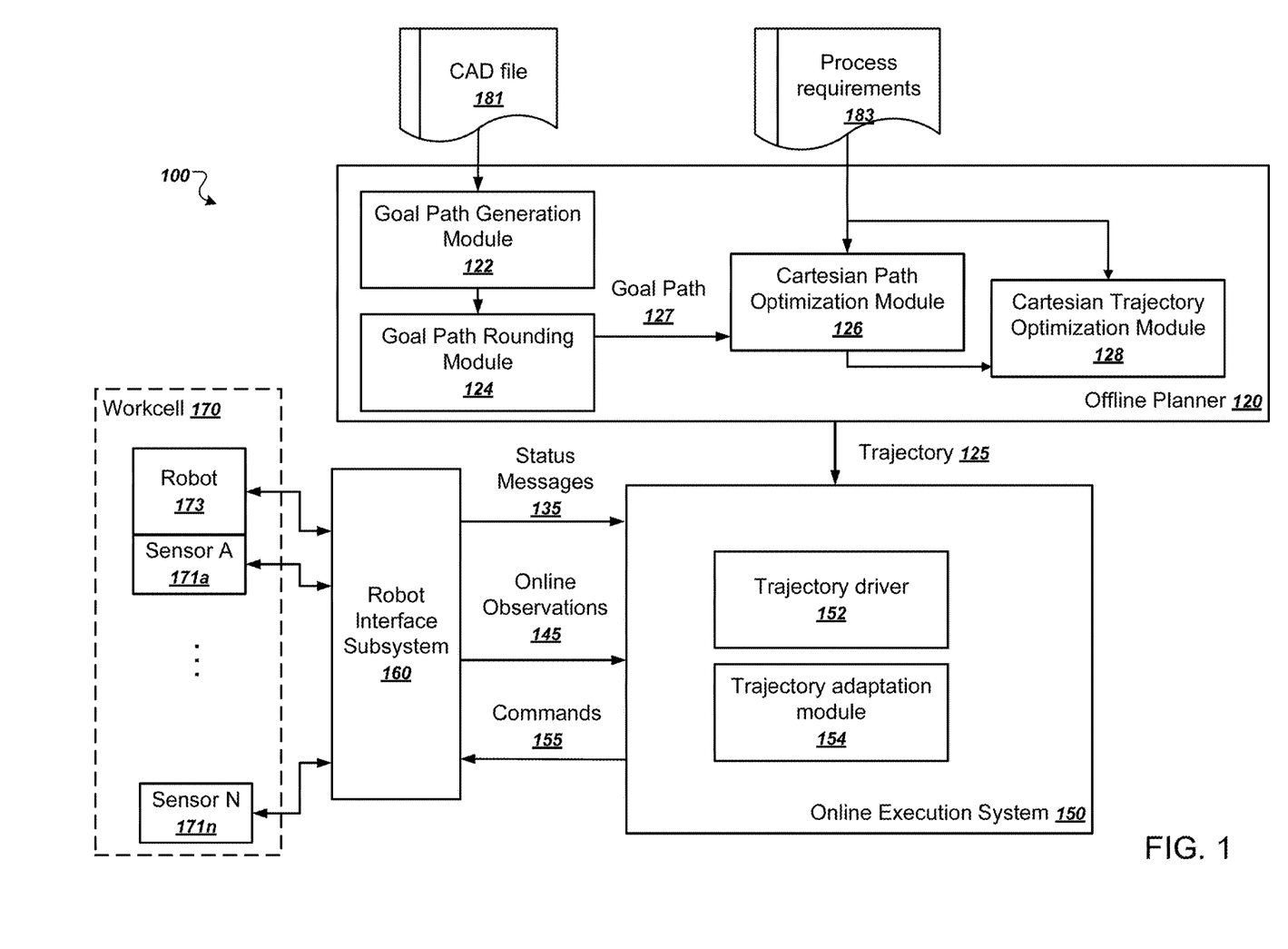
FIG. 1 is a diagram that illustrates an example system.

FIG. 1 is a diagram that illustrates an example system 100. The system 100 is an example of a system that can implement the online robotic control techniques described in this specification.

The system 100 includes a number of functional components, including an online execution system 150 and a robot interface subsystem 160. Each of these components can be implemented as computer programs installed on one or more computers in one or more locations that are coupled to each other through any appropriate communications network, e.g., an intranet or the Internet, or combination of networks.

In general, the online execution system 150 provides commands 155 to be executed by the robot interface subsystem 160, which drives a robot, e.g., robot 173, in a workcell 170. A workcell is the physical environment in which a robot will operate. Workcells have particular physical properties, e.g., physical dimensions that impose constraints on how robots can move within the workcell.

Figure 2:
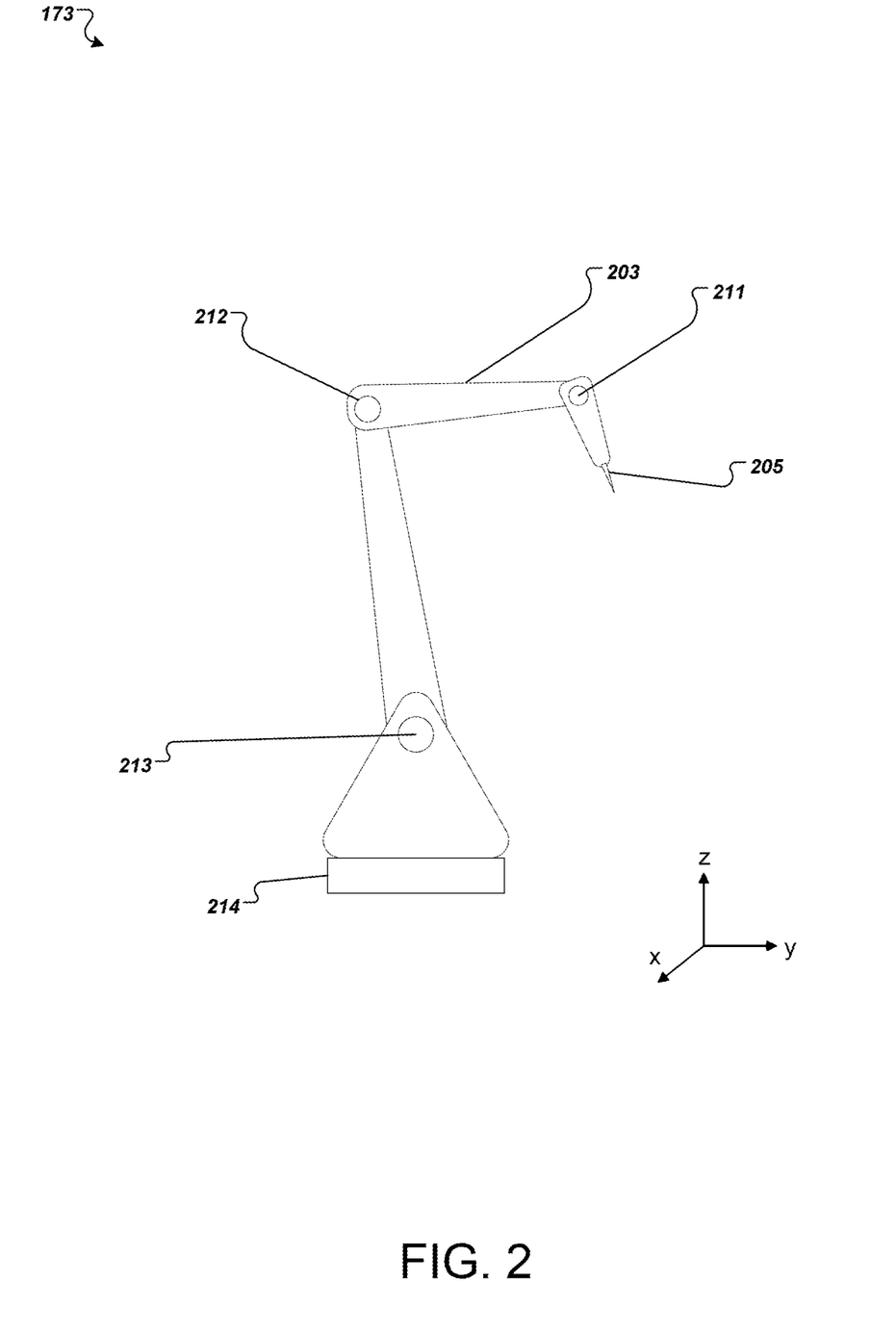
FIG. 2 is an illustration of a robot.

As shown on FIG. 2, an example robot 173 includes an arm 203 and an end effector 205 at the end of the arm 203. The arm 203 includes a plurality of joints 211-214. The end effector 205 can be a tool, e.g., a welding device, spray gun, or a gripper, to name just a few examples. For a given robot, a joint configuration of the robot is defined by joint parameters (e.g., the angles of each of the joints 211-214 of the robot). The joint configuration of the robot can thus determine the location and orientation of the end effector 205. A given location and orientation of the end effector 205 may correspond to one or more joint configurations of the robot.

A Cartesian pose is defined by a location and an orientation of a component of the robot, e.g., the end effector 205. A Cartesian pose can be defined by a set of Cartesian coordinates in a Cartesian coordinate system. A set of Cartesian coordinates is a set of two or more positional coordinates, e.g., (x, y, z), which can represent distances to the point along three axes. Cartesian coordinates can also include two or more rotational coordinates, e.g., (rx, ry, rz), that define an orientation of a robot component, e.g., the end effector, at the (x, y, z) coordinate. Kinematic equations can map joint parameters to corresponding sets of Cartesian coordinates. The dimensions of the robot and its kinematic equations define the volume of the workcell, which is the space reachable by the robot.

As shown on FIG. 1, in order to compute the commands 155, the online execution system 150 consumes status messages 135 generated by the robot 173 and online observations 145 made by one or more sensors 171a-n making observations within the workcell 170. A robot can have multiple sensors. Alternatively or in addition, sensors can be mounted on stationary or movable surfaces in the workcell 170.

The online execution system 150 issues commands 155 to the robot interface system 160 in order to actually drive the movements of the moveable components, e.g., the joints, of the robot 173. In some implementations, the robot interface subsystem 160 provides a hardware-agnostic interface so that the commands 155 issued by online execution engine 150 are compatible with multiple different versions of robots. During execution the robot interface subsystem 160 can report status messages 135 back to the online execution system 150 so that the online execution system 150 can make online adjustments to the robot movements, e.g., due to local faults or other unanticipated conditions.

The robot interface subsystem 160 and the online execution system 150 can operate according to different timing constraints. In some implementations, the robot interface subsystem 160 is a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The online execution system 150, on the other hand, typically has more flexibility in operation. In other words, the online execution system 150 may, but need not, provide a command 155 within every real-time time window under which the robot interface subsystem 160 operates. However, in order to provide the ability to make sensor-based reactions, the online execution system 150 may still operate under strict timing requirements. In a typical system, the real-time requirements of the robot interface subsystem 160 require that the robots provide a command periodically, such as every 5 milliseconds, while the online requirements of the online execution system 150 specify that the online execution system 150 should provide a command 155 to the robot interface subsystem 160 at a lower frequency, such as every 20 milliseconds or every second. However, even if such a command is not received within the online time window, the robot interface subsystem 160 need not necessarily enter a fault state.

Thus, in this specification, the term online refers to both the time and rigidity parameters for operation. The time windows are larger than those for the real-time robot interface subsystem 160, and there is typically more flexibility when the timing constraints are not met.

The system 100 also includes an offline planner 120. Prior to execution, the offline planner 120 generates a Cartesian trajectory 125 for the robot to follow based on goal path that the end effector of the robot should follow. The offline planner 120 comprises a Cartesian path optimization module 126, and a Cartesian trajectory optimization module 128. The Cartesian path optimization module 126 can compute an initial Cartesian path based on a goal path 127 as well as process requirements 183 of the path-based application. The Cartesian trajectory optimization module 128 can compute an adjusted velocity profile based on the dynamics properties of the robot. The adjusted velocity profile defines how to traverse the initial Cartesian path with respect to time. In some implementations, the robot interface subsystem can use the adjusted velocity profile to provide an input to the robot at each control cycle. The Cartesian trajectory optimization module 128 can generate a Cartesian trajectory 125 based on the initial Cartesian path and on the adjusted velocity profile. This process is described in more detail below with reference to FIG. 3. In particular, the adjusted velocity profile may be computed based on how much one or more dynamic limits of the robot would be exceeded if the robot followed an initial joint-space trajectory having an initial velocity profile over the initial Cartesian path. This process is described in more detail below with reference to FIG. 4.

In some embodiments, the offline planner 120 generates the goal path based on a CAD file 181. The CAD file comprises a representation, e.g., a parametric description, of the goal path and the workpiece. The offline planner 120 further comprises a goal path generation module 122, and optionally a goal path rounding module 124. The goal path generation module 122 can access the CAD file and generate the goal path based on the representation of the goal path and the workpiece. The goal path rounding module 124 optionally applies corner filtering to the goal path generated by the goal path generation module 122. This process is described in more detail below with reference to FIG. 6.

The offline planning process is typically computationally expensive. Thus, in some implementations, the offline planner 120 is implemented by a cloud-based computing system comprising many, possibly thousands, of computers. The offline planner 120 is thus commonly physically remote from a facility that houses the workcell 170. On the other hand, the online execution engine 150 is typically local to the facility that houses the workcell 170.

This arrangement thus provides three different computing zones. The offline planner 120 can use massive cloud-based computing resources to consider many possibilities for generating the candidate motion plans. The online execution engine 150 allows for online reaction to unanticipated events. The robot interface subsystem 160 provides precision and real-time safety mechanisms.

In execution, the robot 173 generally continually executes the commands specified explicitly or implicitly by motion plans to perform the various tasks or transitions of the motion plan. The robot can be a real-time robot, which means that the robot is programmed to continually execute its commands according to a highly constrained timeline. For example, the robot can expect a command from the robot interface subsystem 160 at a particular frequency, e.g., 100 Hz or 1 kHz. If the robot does not receive a command that is expected, the robot can enter a fault mode and stop operating.

The online execution engine 150 includes a trajectory driver 152. In execution, the trajectory driver 152 controls the robot according to the Cartesian trajectory 125 generated by the offline planner 120. In some embodiments, the online execution engine 150 also includes a trajectory adaptation module 154. The trajectory adaptation module 154 obtains present observations of the workcell 170, and adjusts the Cartesian trajectory 125 according to the present observations of the workcell. The trajectory driver 152 generates a final joint-space trajectory based on the Cartesian trajectory 125 (or the Cartesian trajectory adjusted by the trajectory adaptation module 154) and executes the final joint-space trajectory by passing it as a fully sampled trajectory to the robot interface subsystem 160. This process is described in more detail below with reference to FIG. 5.

Figure 3:
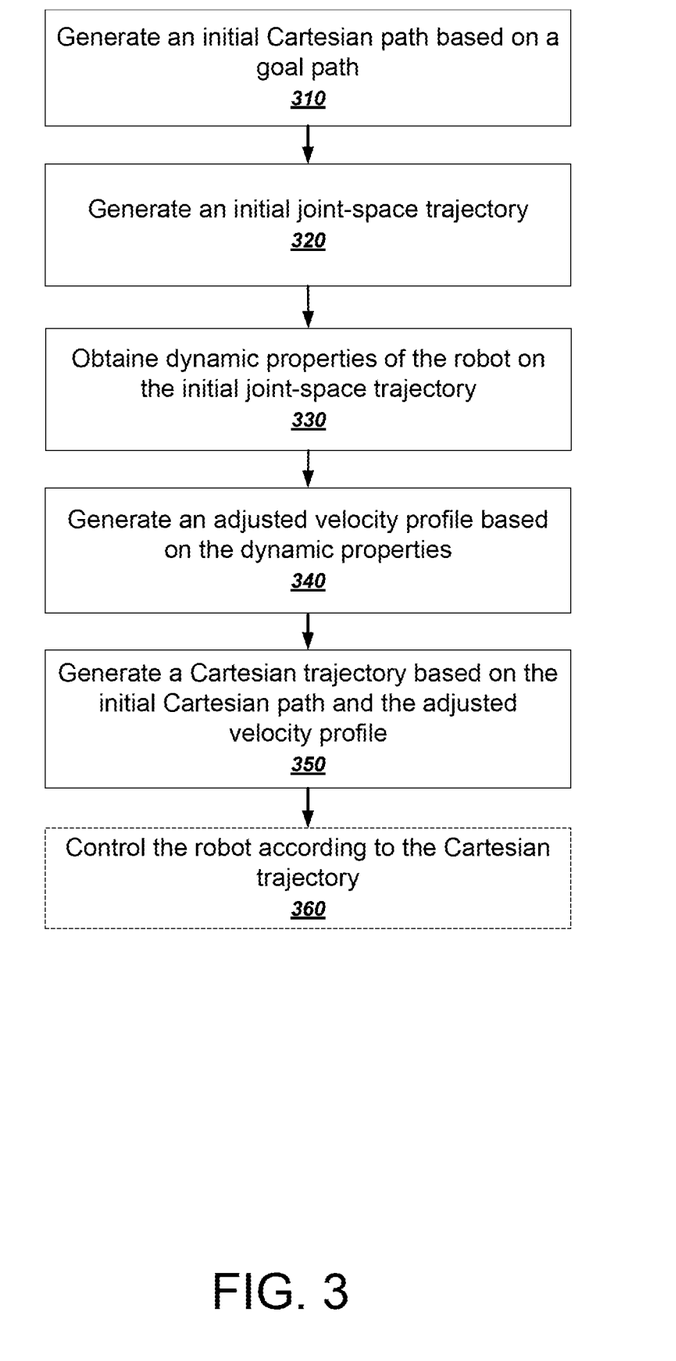
FIG. 3 is a flowchart of an example process for generating a trajectory to be executed by a robot.

FIG. 3 is a flowchart of an example process for automatically generating a trajectory to cause a robot to follow a goal path. The process can be implemented by one or more computer programs installed on one or more computers in one or more locations and programmed in accordance with this specification. For example, the process can be performed by the offline planner 120 and the online execution system 150 shown in FIG. 1. For convenience, the process will be described as being performed by a system of one or more computers.

The system (e.g., Cartesian path optimization module 126) computes an initial Cartesian path based on a goal path that the end effector of the robot should follow (310). The initial Cartesian path can be defined by a sequence of Cartesian poses. Each Cartesian pose can be defined by a location of the end effector of the robot within a particular coordinate system, as well as the orientation of the end effector.

The goal path can represent a physical path on a typical workpiece that the end effector of the robot should follow as closely as possible given parameters of the process definition. For example, the goal path can be a path along an edge of a workpiece along which the robot will apply a deburring tool. In another example, the goal path can be a path on a work piece along which the robot will apply glue.

The representation of the input goal path can also be discretized such that it is defined by a sequence of Cartesian goal poses. For example, each Cartesian goal pose can be defined by a set of parameters comprising at least a Cartesian goal location (e.g., a Cartesian location that the end effector of the robot should reach). A Cartesian goal pose can additionally be defined by an orientation (e.g., an orientation that the end effector of the robot should take at the Cartesian goal location of the Cartesian goal pose). The orientation can be defined with respect to the path tangent and/or the surface normal. In some implementations, the goal path is generated based on a parametric description of the goal path and a parametric description of the workpiece. This process is described in more detail below with reference to FIG. 6.

The system can also optimize the initial Cartesian path to follow the goal path while fulfilling one or more process requirements 183 defined for the process. Process requirements may include rotation limits, distance limits and deviation limits. Process requirements can also include requirements that one or more process parameters used to verify one or more process limits.

Process parameters can include one or more of:
an angle of a rotation axis of the tip of the tool with respect to the surface of the workpiece (e.g., a tilt of the rotation angle);
a distance between the normal to the tool and the surface of the workpiece;
a distance between the orthogonal to the tool and the surface of the workpiece;
a translational or angular velocity of the tool relative to the path;
a translational or angular acceleration of the tool;
a distance between the end effector and the goal path; or
a radius of a corner along the path.

Process limits can include one or more of:
a range of allowed values for the angle of the rotation axis of the tip of the tool with respect to the surface of the workpiece;
a range of allowed values for the distance between the normal to the tool and the surface of the workpiece;
a range of allowed values for the distance between the orthogonal to the tool and the surface of the workpiece;
a maximum translational or angular velocity of the tool relative to the path;
a maximum translational or angular acceleration of the tool;
a maximum distance from the goal path; or
a minimum radius of a corner along the path.

For example, for a glue dispensing application, permitted process parameter ranges can include a normal rotation range of 0-360 degrees, a tilt rotation range of +/−20 degrees, a translational velocity range of 0.1-0.2 m/s, and minimum radius of 0.01 m. As another example, the process requirements of an edge deburring application can include a range of rotation around the tangent axis of the edge, a range of permitted deviation, and a maximum velocity.

The goal path can be described in a three-dimensional (3D) workspace. The motion of the robot can be represented as a path in a configuration space of the robot. For example, if the movement of the robot has N degrees of freedom, the configuration space is N-dimensional. The Cartesian configuration of the robot has at least four degrees of freedom (e.g., a three-dimensional location of the end-effector as well as an orientation of the end-effector). The Cartesian configuration space of the robot has thus a higher dimensionality than the workspace of the goal path. The free parameter space of the transform from the Cartesian pose of the robot to the Cartesian goal pose on the goal path is the space of possible parameter values of the robot that is not constrained by the goal path nor by the process requirements. The Cartesian path optimization uses variables in the free parameter space of the transform from the Cartesian pose of the robot to the Cartesian goal pose on the goal path. In some embodiments, the orientation of the end-effector is used as a free parameter to optimize the Cartesian path.

The system can also optionally optimize the Cartesian path by considering multiple paths and selecting a path that best minimizes a path optimization cost function. The path optimization cost function can include one or more of a deviation cost, an orientation cost, a singularity cost, and a variation cost. The path optimization cost function can be integrated over the Cartesian path. The deviation cost is associated with a distance between the location of the end effector and the goal path. In particular, the deviation cost can include, for some or all of the Cartesian poses of the Cartesian path, a cost associated with a distance between the location of the end effector at the Cartesian pose and the location of the corresponding Cartesian goal pose. The orientation cost is associated with a difference between the angle of the end effector and an optimal angle of the end effector. The singularity cost is associated with a difficulty to reach one or more Cartesian poses along the path. A Cartesian pose can be difficult to reach because it is difficult or impossible to reach by inverse kinematics because of an ill-conditioned Jacobian matrix. The singularity cost of a Cartesian pose can be computed based on the kinematic equations of the robot, or on the Jacobian matrix of the robot. The variation cost is associated with how much and how rapidly the Cartesian pose of the robot is changed over the Cartesian path. The variation cost increases when the Cartesian pose is rapidly changed.

The resulting initial Cartesian path generally has no notion of velocity or time. The Cartesian path is a smooth function from distance travelled along the path to a Cartesian pose (e.g., position and orientation). In some implementation, the Cartesian path is approximated with discrete distance and time series, or with higher-order approximation using B-splines. In particular, if the Cartesian path is a differentiable function, the Cartesian path can be defined as a one-dimensional B-spline with a knot density matching the discretization of the goal path.

The system (e.g., Cartesian trajectory optimization module 128) generates an initial joint-space trajectory (320). In order to compute the initial joint-space trajectory, the system can compute a joint-space path based on the initial Cartesian path. For example, the system can use inverse kinematics solvers to compute a joint-space pose for each Cartesian-space pose of the initial Cartesian path. The initial joint-space trajectory can then be generated by applying an initial velocity profile over the joint-space path.

The initial velocity profile is a function from distance travelled along the path to speed. The system can calculate, from the initial velocity profile, a function from time to distance. The system can then compose the time-to-distance function with the joint-space path function to calculate the initial joint-space trajectory.

In some implementations, the initial velocity profile has a constant Cartesian velocity along the path. In this specification, a velocity being "constant" means that the offline planner simulates motion of the end effector to have a Cartesian velocity that stays within a particular velocity threshold. If such a plan is executed on an actual robot, the robot may or may not achieve an actual constant velocity in Cartesian space. In other words, a velocity described as being constant does not mean that the velocity must maintain precisely the same numerical value either in simulation or when executed on an actual robot. In some implementations, the system uses the maximum Cartesian velocity of the robot as the constant Cartesian velocity.

In some implementations, the system performs a search over multiple joint configurations if there are redundant degrees of freedoms in the robot or in the process parameters. The system can then select a final joint-space trajectory based on one or more criteria, e.g. speed or reliability.

The system can also perform simulated null-space joint control with a damping term in order to find a fully reachable and smooth joint-space trajectory.

The system (e.g., Cartesian trajectory optimization module 128) obtains dynamic properties of the robot while the robot traverses the initial joint-space trajectory (330). The dynamic properties of the robot can include one or more of a rotational velocity, a Cartesian acceleration, a joint-space distance to a position limit, a joint velocity, a joint acceleration or a jerk. In some implementations, the system runs a simulation of the robot traversing the initial joint-space trajectory. The results of the simulation are used to compute the dynamic properties of the robot while the robot traverses the initial joint-space trajectory.

The system (e.g., Cartesian trajectory optimization module 128) generates an adjusted velocity profile over the initial Cartesian path based on the obtained dynamic properties of the robot (340). The adjusted velocity profile defines how to traverse the initial Cartesian path with respect to time. For each of a plurality of goal points along the initial Cartesian path, an adjusted velocity value is computed based on the dynamic properties of the robot obtained at that goal point. The sequence of adjusted velocity values define the adjusted velocity profile. In some embodiments, the adjusted velocity profile is computed based on how much dynamic limits of the robot would be exceeded if the robot followed the initial joint-space trajectory. This process is described in more detail below with reference to FIG. 4. Additionally or alternatively, the adjusted velocity profile can be optimized by maximizing the velocity without exceeding the dynamic limits of the robot and without exceeding a variation limit associated with how rapidly the velocity is changed within the profile.

The system (e.g., Cartesian trajectory optimization module 128) generates a Cartesian trajectory to be followed by the robot (350). The system can generate the trajectory by combining the initial Cartesian path and the adjusted velocity profile. The system can mathematically compose the adjusted velocity profile and the initial Cartesian path in order to generate a Cartesian trajectory with a notion of velocity. The Cartesian path is a function from distance travelled along the path to a Cartesian pose (e.g., position and orientation). The adjusted velocity profile is a function from distance travelled along the path to speed. The system can calculate, from the adjusted velocity profile, a function from time to distance. The system can then compose the time-to-distance function with the Cartesian path to calculate the function from time to Carian pose. The resulting function is the Cartesian trajectory. In some implementation, the functions are approximated with discrete distance and time series, or with higher-order approximation using B-splines. In some implementations, the system iterates over the B-spline of the initial Cartesian path in step sizes determined by the adjusted velocity profile.

The system (e.g., robot interface subsystem) can optionally control the robot according to the generated Cartesian trajectory (360). The system (e.g., trajectory driver 152) generates a final joint-space trajectory based on the generated Cartesian trajectory and executes the final joint-space trajectory (e.g., by passing it as a fully sampled trajectory to the robot interface subsystem 160). The final joint-space trajectory can be computed based on the joint-space path generated at 320, or by applying inverse kinematics to the Cartesian trajectory. As described in more detail below with reference to FIG. 5, the system can also adjust the Cartesian trajectory to present observations in the workcell.

Figure 4:
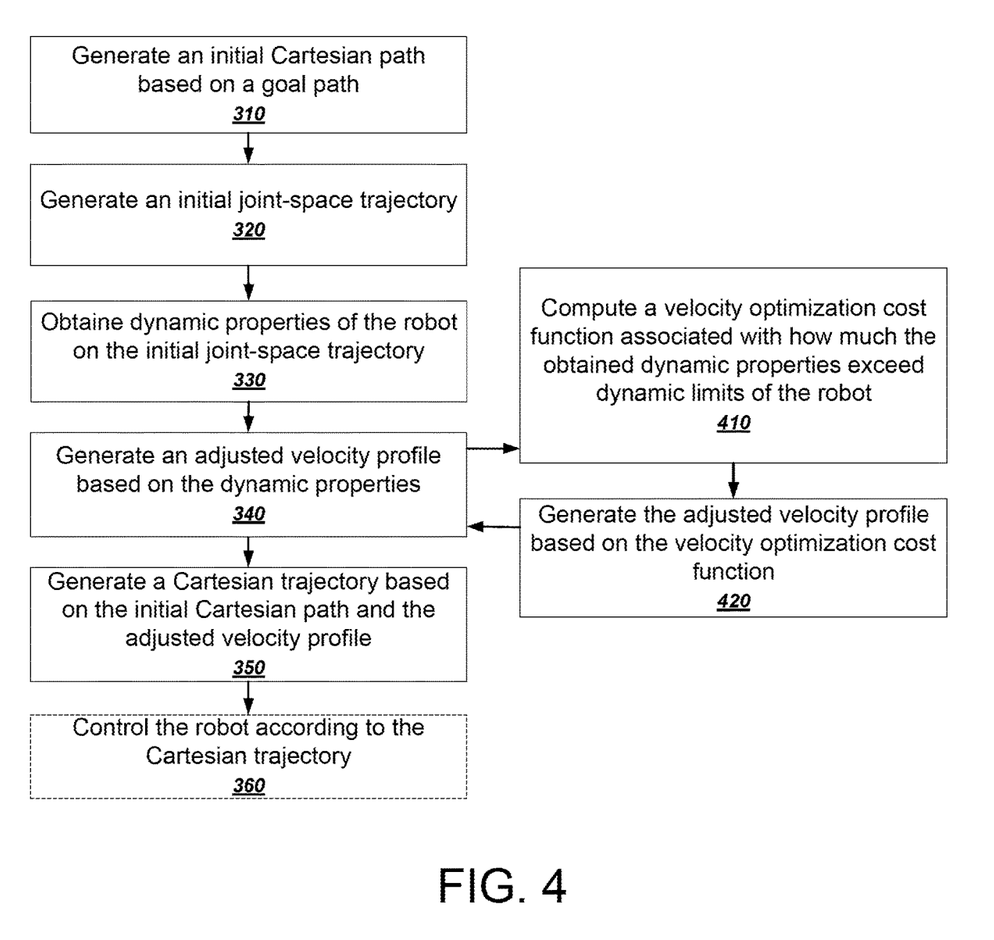
FIG. 4 is a flowchart of another example process for generating a trajectory to be executed by a robot.

FIG. 4 is a flowchart of an example process for computing the adjusted velocity profile based on how much one or more dynamic limits of the robot would be exceeded if the robot followed the initial joint-space trajectory.

The system (e.g., Cartesian trajectory optimization module 128) computes a velocity optimization cost function associated with how much dynamic limits of the robot would be exceeded if the robot followed the initial joint-space trajectory (410). In particular, the system can compare the obtained dynamic properties (e.g., obtained at 330) with the dynamic limits of the robot. A dynamic limit of the robot can be a range, a maximum or a minimum of a dynamic property of the robot.

The system computes the adjusted velocity profile over the initial Cartesian path based on the computed velocity optimization cost function (420). For each Cartesian pose along the initial Cartesian path, a velocity value is computed based on the velocity optimization cost function. In some embodiments, the adjusted velocity profile is inversely proportional to the velocity optimization cost function. For each Cartesian pose on the initial Cartesian path, the velocity value is inversely proportional to how much the dynamic limits of the robot would be exceeded at the Cartesian pose if the robot was to traverse the initial joint-space trajectory. If the initial Cartesian path is a B-spline, the velocity values around the knots are also reduced to stay within Cartesian acceleration limits. In some embodiments, a low-pass filter is applied to the adjusted velocity profile. The low-pass filter can smooth the velocity by limiting rapidly changing poses.

In some embodiments, the velocity profile computed based on the optimization cost function is used as an initial guess in the optimization of the adjusted velocity profile. In particular, the adjusted velocity profile can be further optimized by maximizing the velocity without exceeding the dynamic limits of the robot and without exceeding a variation limit associated with how rapidly the velocity is changed within the profile.

Figure 5:
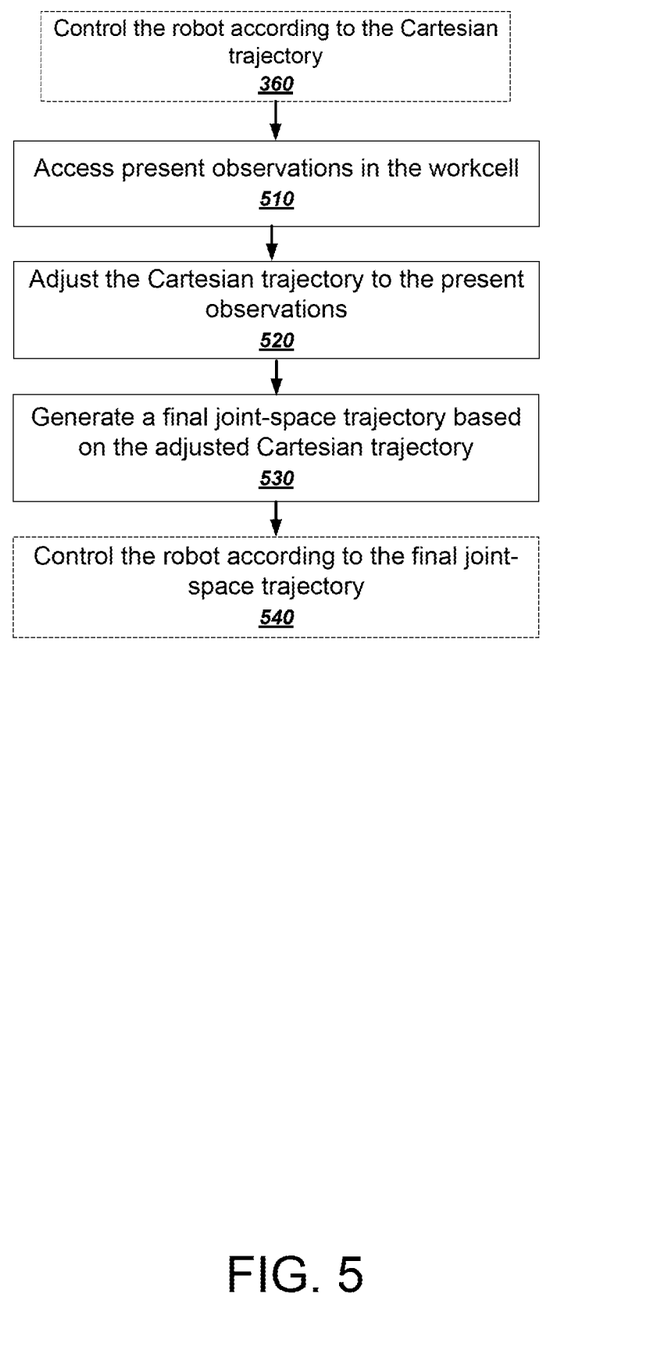
FIG. 5 is a flowchart of an example process for adjusting the trajectory to be executed by a robot.

FIG. 5 is a flowchart of an example process for adjusting the generated trajectory to present observations in the workcell. The process can be implemented by one or more computer programs installed on one or more computers in one or more locations and programmed in accordance with this specification. For example, the process can be performed by the online execution system 150 shown in FIG. 1. For convenience, the process will be described as being performed by a system of one or more computers.

The trajectory (e.g., generated at 350) is generated for a nominal workcell state, and in particular for a nominal pose of the workpiece in the workcell. The generated trajectory might not be exactly adapted for the actual present conditions in the workcell. In particular, the workpiece might not be in the nominal pose used when generating the trajectory. This can happen for example when the workpiece is not fastened. The system adjusts the generated trajectory based on the present observations made by the robot in the workcell. This allows robot applications on workpieces without fixtures.

The system (e.g., trajectory adaptation module 154) accesses present observations in the workcell (510). The present observations can be status messages (e.g., status messages 135) generated by the robot and online observations (e.g., online observations 145) made by one or more sensors (e.g., sensors 171*a-n*) making observations within the workcell.

The system (e.g., trajectory adaptation module 154) adjusts the Cartesian trajectory based on the present observations in the workcell (520). In particular, Cartesian poses of the generated trajectory can be adjusted to more closely align with the present observations in the workcell. For example, the actual location of goal points or goal paths may differ from the location of goal points or goal paths that were used to generate the trajectory. In that case, Cartesian poses of the generated trajectory are adjusted to better follow the goal path.

In an example, the actual workpiece has a shape identical to the shape of the nominal workpiece but is located at a different location. The system can determine a transformation corresponding to the difference between the nominal location of the workpiece and the actual location of the workpiece. The system then multiplies the entire Cartesian trajectory with the transformation.

In another example, the shape of the actual workpiece is not identical to the shape of the nominal workpiece. The system can determine a deformation between the nominal workpiece and the actual workpiece. The system can then compute an adaptation transform corresponding to the deformation. The system then applies the adaptation transform for every robot control time step in the Cartesian trajectory or for every knot in a spline approximation in the Cartesian trajectory. In some implementations, the system provides a lookup function corresponding to the deformation. If the deformation is only available for a list of nominal poses and the corresponding actual poses (e.g., actual locations of the corners of a deformable workspace), the system can interpolate among k-nearest neighbors, weighted by the distance to the nominal pose. The system then either applies the adaptation transform for every robot control time step in the Cartesian trajectory or for every knot in a spline approximation in the Cartesian trajectory.

The system (e.g., trajectory driver 152) generates a final joint-space trajectory based on the adjusted Cartesian trajectory (530). The final joint-space trajectory can be computed by applying inverse kinematics to the adjusted Cartesian trajectory. The system can execute the final joint-space trajectory (e.g., by passing it as a fully sampled trajectory to the robot interface subsystem 160). The system (e.g., robot interface subsystem) can then control the robot according to the final joint-space trajectory (540).

Figure 6:
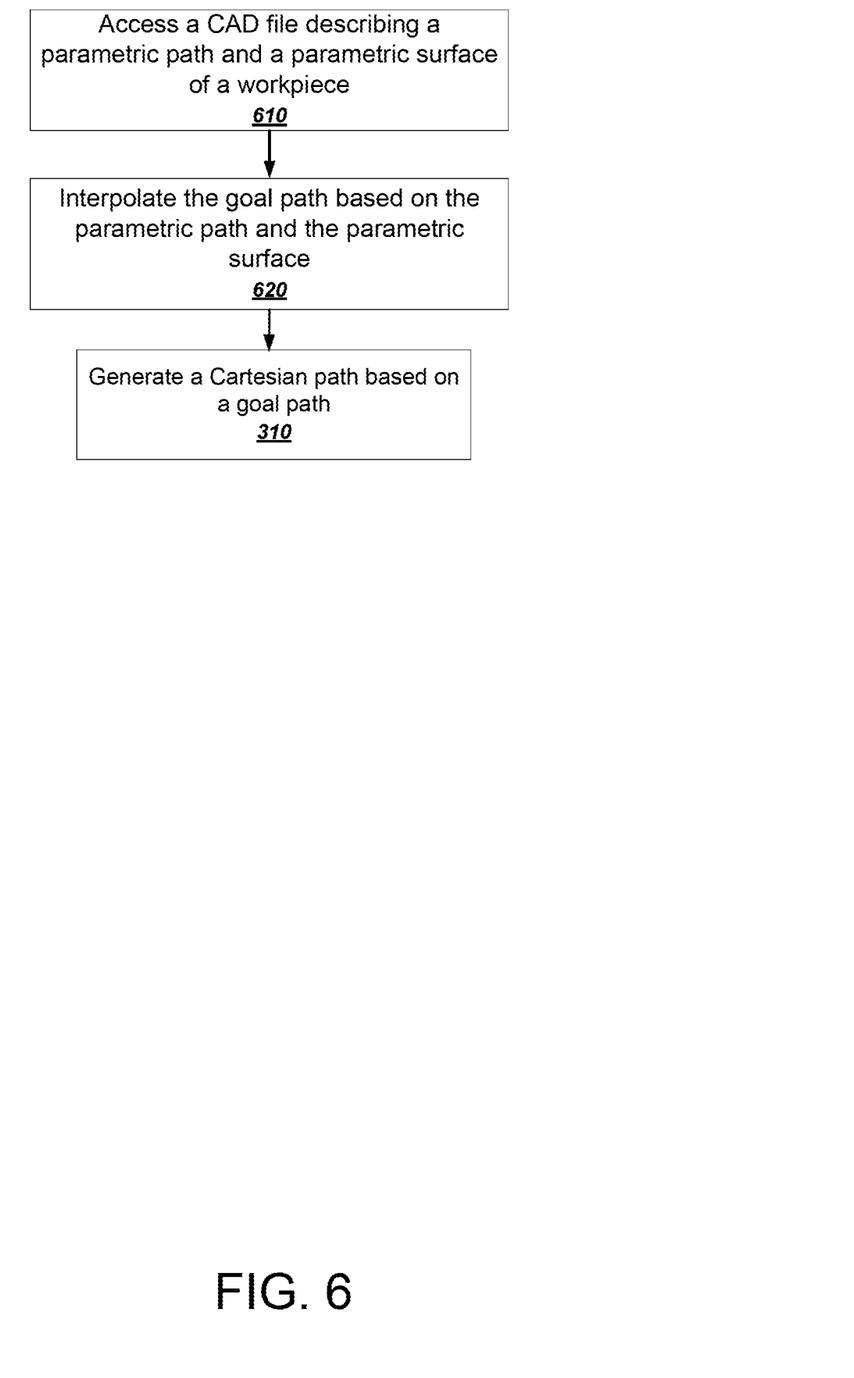
FIG. 6 is a flowchart of an example process for generating a goal path.

As shown in FIG. 6, the goal path can be generated based on a parametric description of the goal path and a parametric description of the workpiece.

The system accesses a Computer-aided design (CAD) data file describing the workpiece (610). The CAD data file describes the parametric surfaces of the workpiece and a parametric path on the workpiece. The parametric path can be described in a 2D or 3D workspace. The parametric path comprises a discrete set of data points.

The system interpolates the goal path from the parametric path and the parametric surface of the workpiece (620). The system interpolates the goal path from the parametric path by constructing new Cartesian goal poses within the range of the discrete set of data points of the parametric path. In particular, the goal path can be interpolated from the parametric path by generating one or more equidistant Cartesian goal poses between two data points of the parametric path. The goal location of each Cartesian goal pose is interpolated based on the parametric path. The goal orientation of each Cartesian goal pose is interpolated based on a tangent to the parametric path and a normal to the parametric surface.

In this specification, a robot is a machine having a base position, one or more movable components, and a kinematic model that can be used to map desired positions, poses, or both in one coordinate system, e.g., Cartesian coordinates or joint angles, into commands for physically moving the one or more movable components to the desired positions or poses. In this specification, an end effector is a device that is part of and is attached at the end of the kinematic chain of the one or more moveable components of the robot. An end effector can be a tool. Example tools include grippers, welding devices, and sanding devices.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the online execution engine 150 and the robot interface subsystem 160 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached embodiments and the embodiments described above, the following embodiments are also innovative:

Embodiment 1 is a method comprising:
   generating an initial Cartesian path representing how an end effector of a robot should follow a goal path on a workpiece;
   generating an initial joint-space trajectory having an initial velocity profile over the initial Cartesian path;
   obtaining one or more dynamic properties of the robot while the robot traverses the initial joint-space trajectory;
   generating an adjusted velocity profile over the initial Cartesian path based on the obtained one or more dynamic properties of the robot; and
   generating a Cartesian trajectory to be followed by the robot, wherein the Cartesian trajectory is generated based on the initial Cartesian path and the adjusted velocity profile.

Embodiment 2 is the method of embodiment 1, wherein generating the adjusted velocity profile over the initial Cartesian path comprises:
   computing a velocity optimization cost function associated with how much the obtained dynamic properties of the robot exceed one or more dynamic limits of the robot; and
   generating the adjusted velocity profile over the initial Cartesian path based on the velocity optimization cost function.

Embodiment 3 is the method of embodiment 2, wherein the adjusted velocity profile is inversely proportional to the velocity optimization cost function.

Embodiment 4 is the method of embodiment 2, wherein the one or more dynamic limits of the robot comprise one or more of a maximum joint position, a maximum joint velocity, a maximum joint acceleration, a maximum Cartesian velocity, a maximum Cartesian acceleration, or a maximum jerk.

Embodiment 5 is the method of embodiment 2, wherein generating the adjusted velocity profile over the initial Cartesian path further comprises applying a low-pass filter to the adjusted velocity profile.

Embodiment 6 is the method of embodiment 1, wherein the initial velocity profile is a constant Cartesian velocity profile, wherein a Cartesian velocity stays within a Cartesian velocity threshold along the initial velocity profile.

Embodiment 7 is the method of embodiment 6, wherein the Cartesian velocity threshold is a maximum Cartesian velocity of the robot.

Embodiment 8 is the method of embodiment 1, wherein the one or more dynamic properties of the robot while the robot traverses the initial joint-space trajectory are obtained by running a simulation of the robot traversing the initial joint-space trajectory.

Embodiment 9 is the method of embodiment 1, wherein the initial Cartesian path is defined by a sequence of Cartesian poses, each Cartesian pose being defined by a location of the end effector as well as an orientation of the end effector at the associated location, and wherein generating the initial Cartesian path comprises minimizing a path optimization cost function, wherein the path optimization cost function comprises an orientation cost associated with a difference between an angle of the end with respect to a workpiece and an optimal angle of the end effector with respect to the workpiece.

Embodiment 10 is the method of embodiment 9, wherein the path optimization cost function further comprises of one or more of:
a cost deviation associated with a distance between the location of the end effector and the goal path;
a singularity cost associated with a difficulty to reach the Cartesian poses along the initial Cartesian path; or
a variation cost associated with rapidly changing Cartesian poses along the initial Cartesian path.

Embodiment 11 is the method of embodiment 1, wherein the goal path is defined by a sequence of Cartesian goal poses, each Cartesian goal pose being defined by a goal location of the end effector as well as a goal orientation of the end effector at the associated goal location, and wherein the method further comprises generating the goal path, and wherein generating the goal path comprises:
accessing a data file that describes a parametric path on a parametric surface of a workpiece;
interpolating the goal path based on the parametric path and the parametric surface, wherein the goal location of each Cartesian goal pose is interpolated based on the parametric path, and wherein the goal orientation of each Cartesian goal pose is interpolated based on a tangent to the parametric path and a normal to the parametric surface.

Embodiment 12 is the method of embodiment 11, wherein generating the goal path further comprises:
applying corner filleting to the goal path.

Embodiment 13 is the method of embodiment 1, further comprising:
accessing one or more present observations of the workcell;
adjusting the Cartesian trajectory according to the one or more present observations of the workcell;
generating a final joint-space trajectory based on the adjusted Cartesian trajectory.

Embodiment 14 is the method of embodiment 11, further comprising controlling the robot according to the final joint-space trajectory.

Embodiment 15 is the method of embodiment 13, wherein adjusting the Cartesian trajectory comprises adjusting one or more Cartesian poses in the Cartesian trajectory to more closely align with the one or more present observations of the workcell.

Embodiment 16 is the method of embodiment 1, wherein generating the Cartesian trajectory comprises:
computing, from the adjusted velocity profile, a time-to-distance function mapping time to a distance on the Cartesian path; and
composing the time-to-distance function with the initial Cartesian path to obtain the Cartesian trajectory.

Embodiment 17 is the method of embodiment 1, further comprising using the Cartesian trajectory in an application without fixtures holding the workpiece.

Embodiment 18 is the method of embodiment 1, wherein generating the initial joint-space trajectory comprises:
generating an initial joint-space path by applying inverse kinematics to the initial Cartesian path; and
combining the initial joint-space path with an initial velocity profile having a constant Cartesian velocity along the initial Cartesian path.

Embodiment 19 is a system comprising: one or more computers and one or more storage devices storing instructions that are operable, when executed by the one or more computers, to cause the one or more computers to perform the method of any one of embodiments 1 to 18.

Embodiment 20 is a computer storage medium encoded with a computer program, the program comprising instructions that are operable, when executed by data processing apparatus, to cause the data processing apparatus to perform the method of any one of embodiments 1 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

The invention claimed is:

1. A method comprising:
generating an initial Cartesian path representing how an end effector of a robot should follow a goal path on a workpiece;
performing a simulation of the robot traversing the initial Cartesian path to generate an initial joint-space trajectory of the robot, wherein the simulation specifies a velocity at which the end effector traverses the initial Cartesian path;

obtaining, from the initial joint-space trajectory, one or more dynamic properties of the robot that result from while the end effector of the robot traversing the initial Cartesian path at the specified velocity;

generating an adjusted velocity profile over the initial Cartesian path based on how much the obtained one or more dynamic properties of the robot exceeded one or more corresponding dynamic limits of the robot; and generating a final Cartesian trajectory to be followed by the end effector of the robot that causes the end effector of the robot to follow, the initial Cartesian path according to the adjusted velocity profile.

2. The method of claim 1, wherein generating the adjusted velocity profile over the initial Cartesian path comprises:

computing a velocity optimization cost function associated with how much the obtained one or more dynamic properties of the robot exceed one or more dynamic limits of the robot; and generating the adjusted velocity profile over the initial Cartesian path based on the velocity optimization cost function.

3. The method of claim 2, wherein the one or more dynamic limits of the robot comprise one or more of a maximum joint position, a maximum joint velocity, a maximum joint acceleration, a maximum Cartesian velocity, a maximum Cartesian acceleration, or a maximum jerk.

4. The method of claim 2, wherein generating the adjusted velocity profile over the initial Cartesian path further comprises:

applying a low-pass filter to the adjusted velocity profile.

5. The method of claim 1, wherein performing the simulation comprises keeping the specified velocity of the robot relative to the Cartesian path within a Cartesian velocity threshold.

6. The method of claim 1, wherein the specified velocity of the robot is a maximum translational velocity of the robot relative to the Cartesian path.

7. The method of claim 1, wherein the initial Cartesian path is defined by a sequence of Cartesian poses, each Cartesian pose being defined by a location of the end effector as well as an orientation of the end effector at the location, and wherein generating the initial Cartesian path comprises minimizing a path optimization cost function, wherein the path optimization cost function comprises an orientation cost associated with a difference between an angle of the end with respect to a workpiece and an optimal angle of the end effector with respect to the workpiece.

8. The method of claim 7, wherein the path optimization cost function further comprises of one or more of:

a cost deviation associated with a distance between the location of the end effector and the goal path;

a singularity cost associated with a difficulty to reach the Cartesian poses along the initial Cartesian path; or a variation cost associated with rapidly changing Cartesian poses along the initial Cartesian path.

9. The method of claim 1, wherein the goal path is defined by a sequence of Cartesian goal poses, each Cartesian goal pose being defined by a goal location of the end effector as well as a goal orientation of the end effector at the goal location, and wherein the method further comprises generating the goal path, and wherein generating the goal path comprises:

accessing a data file that describes a parametric path on a parametric surface of a workpiece; and interpolating the goal path based on the parametric path and the parametric surface, wherein the goal location of each Cartesian goal pose is interpolated based on the parametric path, and wherein the goal orientation of each Cartesian goal pose is interpolated based on a tangent to the parametric path and a normal to the parametric surface.

10. The method of claim 9, wherein generating the goal path further comprises:

applying corner filleting to the goal path.

11. The method of claim 1, further comprising:

accessing one or more present observations of the robot in a workcell;

adjusting the Cartesian trajectory according to the one or more present observations of the workcell; and generating a final joint-space trajectory to be followed by the robot in the workcell based on the adjusted Cartesian trajectory.

12. The method of claim 9, further comprising:

controlling the robot in the workcell to cause the robot to follow the final joint-space trajectory.

13. The method of claim 11, wherein adjusting the Cartesian trajectory comprises adjusting one or more Cartesian poses in the Cartesian trajectory to more closely align with the one or more present observations of the workcell.

14. The method of claim 1, wherein generating the Cartesian trajectory comprises:

computing, from the adjusted velocity profile, a time-to-distance function mapping time to a distance on the Cartesian path; and composing the time-to-distance function with the initial Cartesian path to obtain the Cartesian trajectory.

15. The method of claim 1, further comprising using the Cartesian trajectory in an application without fixtures holding the workpiece.

16. The method of claim 1, wherein generating the initial joint-space trajectory comprises:

generating an initial joint-space path by applying inverse kinematics to the initial Cartesian path; and combining the initial joint-space path with an initial velocity profile having a constant Cartesian velocity along the initial Cartesian path.

17. A system comprising:

a memory; and at least one processor configured to access the memory and configured to perform operations comprising:

generating an initial Cartesian path representing how an end effector of a robot should follow a goal path on a workpiece;

performing a simulation of the robot traversing the initial Cartesian path to generate an initial joint-space trajectory of the robot, wherein the simulation specifies a velocity at which the end effector traverses the initial Cartesian path;

obtaining, from the initial joint-space trajectory, one or more dynamic properties of the robot that result from the end effector of the robot traversing the initial Cartesian path at the specified velocity;

generating an adjusted velocity profile over the initial Cartesian path based on how much the obtained one or more dynamic properties of the robot exceeded one or more corresponding dynamic limits of the robot; and generating a final Cartesian trajectory to be followed by the end effector of the robot that causes the end effector of the robot to follow the initial Cartesian path according to the adjusted velocity profile.

18. A non-transitory computer readable medium having stored thereon software instructions that, when executed by at least one processor, cause the processor to perform operations including:
- generating an initial Cartesian path representing how an end effector of a robot should follow a goal path on a workpiece;
- performing a simulation of the robot traversing the initial Cartesian path to generate an initial joint-space trajectory of the robot, wherein the simulation specifies a velocity at which the end effector traverses the initial Cartesian path;
- obtaining, from the initial joint-space trajectory, one or more dynamic properties of the robot that result from the end effector of the robot traversing the initial Cartesian path at the specified velocity;
- generating an adjusted velocity profile over the initial Cartesian path based on how much the obtained one or more dynamic properties of the robot exceeded one or more corresponding dynamic limits of the robot; and
- generating a final Cartesian trajectory to be followed by the end effector of the robot that causes the end effector of the robot to follow the initial Cartesian path according to the adjusted velocity profile.

* * * * *